(12) United States Patent
Zhao et al.

(10) Patent No.: US 7,769,579 B2
(45) Date of Patent: Aug. 3, 2010

(54) LEARNING FACTS FROM SEMI-STRUCTURED TEXT

(75) Inventors: Shubin Zhao, Jersey City, NJ (US); Jonathan T. Betz, Summit, NJ (US)

(73) Assignee: Google Inc., Mountain View, CA (US)

( * ) Notice: Subject to any disclaimer, the term of this patent is extended or adjusted under 35 U.S.C. 154(b) by 710 days.

(21) Appl. No.: 11/142,853

(22) Filed: May 31, 2005

(65) Prior Publication Data

US 2006/0293879 A1    Dec. 28, 2006

(51) Int. Cl.
G06F 17/30 (2006.01)
G06F 17/28 (2006.01)

(52) U.S. Cl. .............. 704/7; 704/8; 704/9; 704/10; 704/251; 704/252; 707/962; 707/E17.118

(58) Field of Classification Search ............ 704/7–10, 704/5, 2, 51, 52; 707/962, E17.118
See application file for complete search history.

(56) References Cited

U.S. PATENT DOCUMENTS

| | | | | |
|---|---|---|---|---|
| 5,010,478 A | | 4/1991 | Deran ................. 364/200 |
| 5,519,608 A | * | 5/1996 | Kupiec ................. 704/9 |
| 5,717,951 A | | 2/1998 | Yabumoto ............ 395/831 |
| 5,778,373 A | | 7/1998 | Levy et al. ........... 707/100 |
| 5,802,299 A | | 9/1998 | Logan et al. ...... 395/200.48 |
| 5,822,743 A | | 10/1998 | Gupta et al. .......... 706/50 |
| 5,826,258 A | | 10/1998 | Gupta et al. .......... 707/4 |
| 5,920,859 A | | 7/1999 | Li ......................... 707/5 |
| 5,943,670 A | | 8/1999 | Prager ................... 707/5 |
| 5,987,460 A | | 11/1999 | Niwa et al. ............ 707/6 |
| 6,038,560 A | * | 3/2000 | Wical .................... 1/1 |
| 6,044,366 A | | 3/2000 | Graffe et al. ........... 707/2 |
| 6,052,693 A | | 4/2000 | Smith et al. ........ 707/104 |
| 6,064,952 A | * | 5/2000 | Imanaka et al. ........ 704/9 |

(Continued)

FOREIGN PATENT DOCUMENTS

WO    WO 01/27713    4/2001

(Continued)

OTHER PUBLICATIONS

Guha, R., et al., "Disambiguating People in Search," World Wide Web Conference, May 17-22, 2004, 9 pages.*

(Continued)

*Primary Examiner*—David R Hudspeth
*Assistant Examiner*—Abdelali Serrou
(74) *Attorney, Agent, or Firm*—Morgan, Lewis & Bockius LLP

(57) ABSTRACT

A method and system of learning, or bootstrapping, facts from semi-structured text is described. Starting with a set of seed facts associated with an object, documents associated with the object are identified. The identified documents are checked to determine if each has at least a first predefined number of seed facts. If a document does have at least a first predefined number of seed facts, a contextual pattern associated with the seed facts is identified and other instances of content in the document matching the contextual pattern are identified. If the document includes at least a second predefined number of the other instances of content matching the contextual pattern, then facts may be extracted from the other instances.

19 Claims, 4 Drawing Sheets

U.S. PATENT DOCUMENTS

| | | | | |
|---|---|---|---|---|
| 6,112,203 | A | 8/2000 | Bharat et al. | 707/5 |
| 6,122,647 | A | 9/2000 | Horowitz et al. | 707/513 |
| 6,134,555 | A | 10/2000 | Chadha et al. | 707/102 |
| 6,212,526 | B1 | 4/2001 | Chaudhuri et al. | 707/102 |
| 6,240,546 | B1 | 5/2001 | Lee et al. | 717/4 |
| 6,285,999 | B1 | 9/2001 | Page | 707/5 |
| 6,289,338 | B1 | 9/2001 | Stoffel et al. | 707/3 |
| 6,311,194 | B1 | 10/2001 | Sheth et al. | 707/505 |
| 6,349,275 | B1 | 2/2002 | Schumacher et al. | 704/8 |
| 6,473,898 | B1 | 10/2002 | Waugh et al. | 717/168 |
| 6,502,102 | B1 | 12/2002 | Haswell et al. | 707/102 |
| 6,567,936 | B1 | 5/2003 | Yang et al. | 714/37 |
| 6,572,661 | B1 | 6/2003 | Stern | 715/501.1 |
| 6,584,464 | B1 | 6/2003 | Warthen | 707/4 |
| 6,606,625 | B1 | 8/2003 | Muslea et al. | 707/6 |
| 6,665,659 | B1 | 12/2003 | Logan | 707/3 |
| 6,665,666 | B1 | 12/2003 | Brown et al. | 707/5 |
| 6,665,837 | B1 | 12/2003 | Dean et al. | 715/501.1 |
| 6,738,767 | B1 * | 5/2004 | Chung et al. | 1/1 |
| 6,754,873 | B1 | 6/2004 | Law et al. | 715/501.1 |
| 6,804,667 | B1 | 10/2004 | Martin | 707/6 |
| 6,823,495 | B1 | 11/2004 | Vedula et al. | 715/805 |
| 6,845,354 | B1 * | 1/2005 | Kuo et al. | 704/9 |
| 6,850,896 | B1 | 2/2005 | Kelman et al. | 705/10 |
| 6,886,005 | B2 | 4/2005 | Davis | 707/2 |
| 6,901,403 | B1 | 5/2005 | Bata et al. | 707/101 |
| 6,904,429 | B2 * | 6/2005 | Sako et al. | 1/1 |
| 6,957,213 | B1 | 10/2005 | Yuret | 707/4 |
| 7,003,522 | B1 | 2/2006 | Reynar et al. | 707/10 |
| 7,003,719 | B1 | 2/2006 | Rosenoff et al. | 715/500.1 |
| 7,020,662 | B2 | 3/2006 | Boreham et al. | 707/104.1 |
| 7,043,521 | B2 * | 5/2006 | Eitel | 709/202 |
| 7,051,023 | B2 | 5/2006 | Kapur et al. | 707/5 |
| 7,080,073 | B1 | 7/2006 | Jiang et al. | 707/7 |
| 7,143,099 | B2 | 11/2006 | Lecheler-Moore et al. | 707/101 |
| 7,158,980 | B2 * | 1/2007 | Shen | 1/1 |
| 7,194,380 | B2 | 3/2007 | Barrow et al. | 702/181 |
| 7,216,073 | B2 * | 5/2007 | Lavi et al. | 704/9 |
| 7,277,879 | B2 | 10/2007 | Varadarajan | 707/1 |
| 7,305,380 | B1 | 12/2007 | Hoelzle et al. | 707/3 |
| 7,363,312 | B2 | 4/2008 | Goldsack | 707/102 |
| 7,409,381 | B1 * | 8/2008 | Steel et al. | 1/1 |
| 7,493,317 | B2 | 2/2009 | Geva | 707/3 |
| 2002/0038307 | A1 | 3/2002 | Obradovic et al. | 707/102 |
| 2002/0042707 | A1 | 4/2002 | Zhao et al. | 704/9 |
| 2002/0065845 | A1 | 5/2002 | Naito et al. | 707/500.1 |
| 2002/0083039 | A1 | 6/2002 | Ferrari et al. | 707/1 |
| 2002/0087567 | A1 | 7/2002 | Spiegler et al. | 707/100 |
| 2002/0169770 | A1 | 11/2002 | Kim et al. | 707/5 |
| 2002/0174099 | A1 * | 11/2002 | Raj et al. | 707/1 |
| 2002/0178448 | A1 | 11/2002 | Te Kiefte et al. | 725/46 |
| 2003/0018652 | A1 | 1/2003 | Heckerman et al. | 707/104.1 |
| 2003/0058706 | A1 | 3/2003 | Okamoto et al. | 365/200 |
| 2003/0078902 | A1 | 4/2003 | Leong et al. | 706/59 |
| 2003/0120675 | A1 | 6/2003 | Stauber et al. | 707/100 |
| 2003/0149567 | A1 | 8/2003 | Schmitz et al. | 704/270 |
| 2003/0177110 | A1 | 9/2003 | Okamoto et al. | 707/3 |
| 2003/0182310 | A1 | 9/2003 | Charnock et al. | 707/104.1 |
| 2004/0003067 | A1 | 1/2004 | Ferrin | 709/223 |
| 2004/0024739 | A1 | 2/2004 | Copperman et al. | 707/1 |
| 2004/0088292 | A1 | 5/2004 | Dettinger et al. | 707/4 |
| 2004/0153456 | A1 | 8/2004 | Charnock et al. | 707/10 |
| 2004/0167870 | A1 | 8/2004 | Wakefield et al. | 707/1 |
| 2004/0177015 | A1 | 9/2004 | Galai et al. | 705/35 |
| 2004/0199923 | A1 | 10/2004 | Russek | 719/310 |
| 2005/0086222 | A1 * | 4/2005 | Wang et al. | 707/5 |
| 2005/0125311 | A1 | 6/2005 | Chidiac et al. | 705/28 |
| 2005/0149576 | A1 | 7/2005 | Marmaros et al. | 707/200 |
| 2005/0149851 | A1 | 7/2005 | Mittal | 715/501.1 |
| 2005/0240615 | A1 | 10/2005 | Barsness et al. | 707/102 |
| 2006/0036504 | A1 | 2/2006 | Allocca et al. | 705/26 |
| 2006/0074824 | A1 | 4/2006 | Li | 706/20 |
| 2006/0074910 | A1 | 4/2006 | Yun et al. | 707/7 |
| 2006/0152755 | A1 | 7/2006 | Curtis et al. | 358/1.15 |
| 2006/0253418 | A1 | 11/2006 | Charnock et al. | 707/1 |
| 2006/0293879 | A1 | 12/2006 | Zhao et al. | 704/9 |
| 2007/0005593 | A1 | 1/2007 | Self et al. | 707/6 |
| 2007/0005639 | A1 | 1/2007 | Gaussier et al. | 707/103 |
| 2007/0016890 | A1 | 1/2007 | Brunner et al. | 717/107 |
| 2007/0055656 | A1 * | 3/2007 | Tunstall-Pedoe | 707/3 |
| 2007/0073768 | A1 | 3/2007 | Goradia | 707/104.1 |
| 2007/0094246 | A1 | 4/2007 | Dill et al. | 707/4 |
| 2007/0130123 | A1 | 6/2007 | Majumder | 707/3 |
| 2007/0150800 | A1 * | 6/2007 | Betz et al. | 715/500 |
| 2007/0198480 | A1 | 8/2007 | Hogue et al. | 707/3 |
| 2007/0198503 | A1 * | 8/2007 | Hogue et al. | 707/5 |
| 2007/0271268 | A1 | 11/2007 | Fontoura et al. | 707/6 |

FOREIGN PATENT DOCUMENTS

| | | |
|---|---|---|
| WO | WO 2004/114163 | 12/2004 |
| WO | WO 2006/104951 A1 | 10/2006 |

OTHER PUBLICATIONS

Downey, D., et al., "Learning Text Patterns for Web Information Extraction and Assessment," American Association for Artificial Intelligence, 2002, 6 pages.*

Gao, X., et al., "Learning Information Extraction Patterns from Tabular Web Pages Without Manual Labelling," Proceedings of IEEE/WIC Int'l Conf. on Web Intelligence (WI'03), Oct. 13-17, 2003, pp. 495-498.*

Raymond kosala "Web mining research" ACM SIGKDD Explorations Newsletters, vol. 1, Issue 1, Jun. 2000, pp. 1-15.*

Hsu et al. "Finite-State Transducers for semi-Structured Text Mining" Proceedings of IJCAI-99 workshop on text mining, Citeseer1999, pp. 1-12.*

Etzioni, O., et al., "Web-Scale Information Extraction in KnowItAll (Preliminary Results)," WWW2004, May 17-22, 2004, New York, New York, 11 pages.

Rioloff, E., et al., "Learning Dictionaries for Information Extraction by Multi-Level Bootstrapping," American Association for Artificial Intelligence, 1999, 6 pages.

Agichtein, E., et al., "*Snowball*: Extracting Relations from Large Plain-Text Collections," Columbia Univ. Computer Science Dept. Technical Report CUCS-033-99, Dec. 1999, pp. 1-13.

Liu, B., et al., "Mining Data Records in Web Pages," SIGKDD '03, Aug. 24-27, 2004, Washington, DC, 2003, pp. 601-606.

International Search Report for International Application No. PCT/US2006/019807, mailed Dec. 18, 2006.

Gao, X., et al., "Learning Information Extraction Patterns from Tabular Web Pages Without Manual Labelling," Proceedings of IEEE/WIC Int'l Conf. on Web Intelligence (WI'03), Piscataway, New Jersey, Oct. 13-17, 2003, pp. 495-498.

Liu, B., et al., "Mining Data Records in Web Pages," http://www/cs.uic.edu/~liub/publications/KDD-03-techReport.pdf, 2003, 10 pages.

Brin, S., "Extracting Patterns and Relations from the World Wide Web," Computer Science, vol. 1590, 1998, pp. 172-183.

Page, L., et al., "The PageRank Citation Ranking: Bringing Order to the Web.," Stanford Digital Libraries Working Paper, 1998.

Haveliwala, T.H., "Topic-Sensitive PageRank," Proceeding of the 11th Int'l World Wide Web Conference, Honolulu, Hawaii, May 7-11, 2002.

Richardson, M., et al., "The Intelligent Surfer: Probabilistic Combination of Link and Content Information in PageRank," Advances in Neural Information Processing Systems, vol. 14, MIT Press, Cambridge, MA, 2002.

Jeh, G., et al., "Scaling Personalized Web Search," Proceedings of the 12th Int'l World Wide Web Conference, Budapest, Hungary, May 20-24, 2003.

Brin, S., et al., "The Anatomy of a Large-cal Hypertextual Search Engine," 7th Int'l World Wide Web Conference, Brisbane, Australia, Apr. 14-18, 1998.

Bunescu, R., et al., "Using Encyclopedia Knowledge for Named Entity Disambiguation," Department of Computer Sciences, University of Texas, retrieved from internet Dec. 28, 2006, 8 pages.

Craswell, N., et al., "Effective Site Finding using Link Anchor Information," SIGIR '01, Sep. 9-12, 2001, pp. 250-257.

Dong, X., et al., "Reference Reconciliation in Complex Information Spaces," SIGACM-SIGMOD, 2005, 12 pages.

Gray, R.M., "Entropy and Information Theory," Springer-Verlag, New York, NY, 1990, pp. 17-46.

Ji, H., et al., "Re-Ranking Algorithms for Name Tagging," Workshop on Computationally Hard Problems and Joint Inference in Speech and Language Processing, Jun. 2006, 8 pages.

Kolodner, J., "Indexing and Retrieval Strategies for Natural Language Fact Retrieval," ACM Trans. Database Syst. 8.3., Sep. 1983, 434-464.

MacKay, D.J.C., "Information Theory, Inference and Learning Algorithms," Cambridge University Press, 2003, pp. 22-33, 138-140.

Mann, G. et al., "Unsupervised Personal Name Disambiguation," Proceedings of the Seventy Conference on Natural Language Learning at HLT-NAACL, 2003, 8 pages.

Pawson, D., "Sorting and Grouping," www.dpawson.co.uk/xsl/sect2/N6280.html>, Feb. 7, 2004, pp. 1-19.

Richardson, M., et al., "Beyond Page Rank: Machine Learning for Static Ranking," International World Wide Web Conference Committee, May 23, 2006, 9 pages.

Shannon, C.E., et al., "A Mathematical Theory of Communication," The Bell System Technical Journal, vol. 27, Jul., Oct. 1948, pp. 1-55.

Sun Microsystems, "Attribute Names," http://java.sun.com/products/jndi/tutorial/basics/directory/attrnames.html>, Feb. 17, 2004, pp. 1-2.

Wang, Y., et al., "C4-2: Combining Link and Contents in Clustering Web Search to Improve Information Interpretation," The University of Tokyo, 2002, pp. 1-9.

* cited by examiner

LEARNING FACTS FROM SEMI-STRUCTURED TEXT

RELATED APPLICATIONS

This application is related to the following applications, each of which is hereby incorporated by reference:

U.S. patent application Ser. No. 11/097,688, "Corroborating Facts Extracted from Multiple Sources," filed on Mar. 31, 2005;

U.S. patent application Ser. No. 11/097,690, "Selecting the Best Answer to a Fact Query from Among a Set of Potential Answers," filed on Mar. 31, 2005;

U.S. patent application Ser. No. 11/097,689, "User Interface for Facts Query Engine with Snippets from Information Sources that Include Query Terms and Answer Terms," filed on Mar. 31, 2005;

U.S. patent application Ser. No. 11/142,740, "Merging Objects in a Facts Database," filed on May 31, 2005;

U.S. patent application Ser. No. 11/142,748, "System for Ensuring the Internal Consistency of a Fact Repository," filed on May 31, 2005; and U.S. patent application Ser. No. 11/142,765, "Identifying the Unifying Subject of a Set of Facts," filed on May 31, 2005.

TECHNICAL FIELD

The disclosed embodiments relate generally to fact databases. More particularly, the disclosed embodiments relate to learning of facts from documents that include factual information presented in semi-structured text.

BACKGROUND

The World Wide Web (also known as the "Web") and the web pages within the Web are a vast source of factual information. Users may look to web pages to get answers to factual questions, such as "what is the capital of Poland" or "what is the birth date of George Washington." The factual information included in web pages may be extracted and stored in a fact database.

Extraction of factual information from web pages may be done by automated processes. However, such automated processes are not perfect. They may miss some factual information and/or misidentify and extract non-factual information as factual information. Furthermore, the process may extract incorrect factual information because the information in the web page was incorrect to begin with or the automated process misinterpreted the information in the web page. Missed factual information reduces coverage of the fact database, and incorrect facts diminish the quality of the fact database.

SUMMARY

According to an aspect of the invention, a method of learning facts includes accessing an object having a name and one or more seed attribute-value pairs; identifying a set of documents associated with the object name, each document in the set having at least a first predefined number of the seed attribute-value pairs of the object; for each of the documents in the identified set: identifying in the document a contextual pattern associated with the seed attribute-value pairs in the document; confirming that the document includes at least a second predefined number of additional instances of content matching the contextual pattern; and when the confirming is successful, extracting an attribute-value pair from a respective instance of content matching the contextual pattern and merging the extracted attribute-value pair into the object.

BRIEF DESCRIPTION OF THE DRAWINGS

Like reference numerals refer to corresponding parts throughout the drawings.

DESCRIPTION OF EMBODIMENTS

Facts in a fact repository may be verified and additional facts may be found and extracted by a bootstrapping process. Starting with one or more of seed facts associated with an object, documents associated with the object and including at least a predefined number of the seed facts are identified. The contextual pattern surrounding the seed facts in these documents are identified. Using the contextual pattern, other content having the same contextual pattern in the documents is found. Facts are identified from the other content having the same contextual pattern. The identified facts may be added to the fact repository or be used to verify facts already in the fact repository. In other words, a process of learning by bootstrapping uses facts already in the fact repository to verify facts and find additional facts to add to the fact repository.

Figure 1:
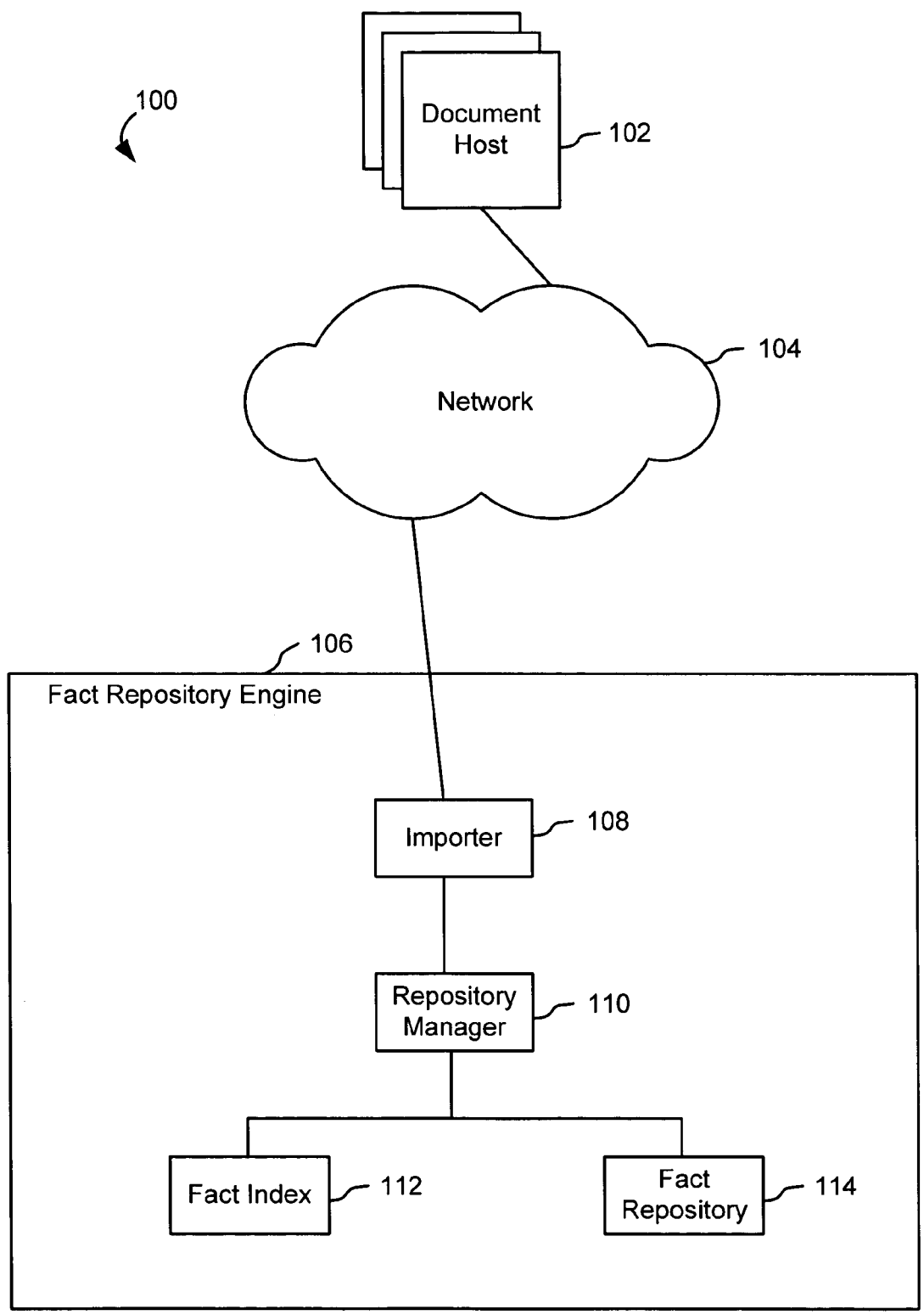
FIG. 1 illustrates a network, according to some embodiments of the invention.

FIG. 1 illustrates a network 100, according to some embodiments of the invention. Network 100 includes one or more document hosts 102 and a fact repository engine 106. The network 100 also includes one or more networks 104 that couple these components.

The document hosts 102 store documents and provide access to documents. A document may be any machine-readable data including any combination of text, graphics, multimedia content, etc. In some embodiments, a document may be a combination of text, graphics and possibly other forms of information written in the Hypertext Markup Language (HTML), i.e., a web page. A document may include one or more hyperlinks to other documents. A document may include one or more facts within its contents. A document stored in a document host 102 may be located and/or identified by a Uniform Resource Locator (URL), or Web address, or any other appropriate form of identification and/or location. Each document may also be associated with a page importance metric. The page importance metric of a document measures the importance, popularity or reputation of the document relative to other documents. In some embodiments, the page importance metric is the PageRank of the document. For more information on the PageRank metric and its computation, see, for example, Page et al., "The PageRank citation ranking: Bringing order to the web," Stanford Digital Libraries Working Paper, 1998; Haveliwala, "Topic-sensitive PageRank," 11th International World Wide Web Conference, Honolulu, Hi., May 7-11, 2002; Richardson and Domingos, "The Intelligent Surfer: Probabilistic Combination of Link and Content Information in PageRank," Vol. 14, MIT Press, Cambridge, Mass., 2002; and Jeh and Widom, "Scaling personalized web search," 12th International World Wide Web Conference, Budapest, Hungary, May 20-24, 2002; Brin and Page, "The Anatomy of a Large-Scale Hypertextual Search Engine," 7th International World Wide Web Conference, Brisbane, Australia, Apr. 14-18, 1998; and U.S. Pat. No. 6,285,999, each of which is hereby incorporated by reference in its entirety as background information.

The fact repository engine 106 includes an importer 108, a repository manager 110, a fact index 112, and a fact repository 114. The importer 108 extracts factual information from documents stored on document hosts 102. The importer 108 analyzes the contents of the documents stored in document host 102, determines if the contents include factual information and the subject or subjects with which the factual information are associated, and extracts any available factual information within the contents.

The repository manager 110 processes facts extracted by the importer 108. The repository manager 110 builds and manages the fact repository 114 and the fact index 112. The repository manager 110 receives facts extracted by the importer 108 and stores them in the fact repository 114. The repository manager 110 may also perform operations on facts in the fact repository 114 to "clean up" the data within the fact repository 114. For example, the repository manager 110 may look through the fact repository 114 to find duplicate facts (that is, facts that convey the exact same factual information) and merge them. The repository manager 110 may also normalize facts into standard formats. The repository manager 110 may also remove unwanted facts from the fact repository 114, such as facts meeting predefined objectionable content criteria.

The fact repository 114 stores factual information extracted from a plurality of documents that are located on the document hosts 102. In other words, the fact repository 114 is a database of factual information. A document from which a particular fact may be extracted is a source document (or "source") of that particular fact. In other words, a source of a fact includes that fact within its contents. Source documents may include, without limitation, web pages. Within the fact repository 114, entities, concepts, and the like for which the fact repository 114 may have factual information stored are represented by objects. An object may have one or more facts associated with it. Each object is a collection of facts. In some embodiments, an object that has no facts associated with it (an empty object) may be viewed as a non-existent object within the fact repository 114. Within each object, each fact associated with the object is stored as an attribute-value pair. Each fact also includes a list of source documents that include the fact within its contents and from which the fact was extracted. Further details about objects and facts in the fact repository are described below, in relation to FIG. 3.

The fact index 112 provides an index to the fact repository 114 and facilitates efficient lookup of information in the fact repository 114. The fact index 112 may index the fact repository 114 based on one or more parameters. For example, the fact index 112 may have an index that maps unique terms (e.g., words, numbers and the like) to records or locations within the fact repository 114. More specifically, the fact index 112 may include entries mapping every term in every object name, fact attribute and fact value of the fact repository to records or locations within the fact repository.

It should be appreciated that each of the components of the fact repository engine 106 may be distributed over multiple computers. For example, the fact repository 114 may be deployed over N servers, with a mapping function such as the "modulo N" function being used to determine which facts are stored in each of the N servers. Similarly, the fact index 112 may be distributed over multiple servers, and the importer 108 and repository manager 110 may each be distributed over multiple computers. However, for convenience of explanation, we will discuss the components of the fact repository engine 106 as though they were implemented on a single computer.

Figure 2:
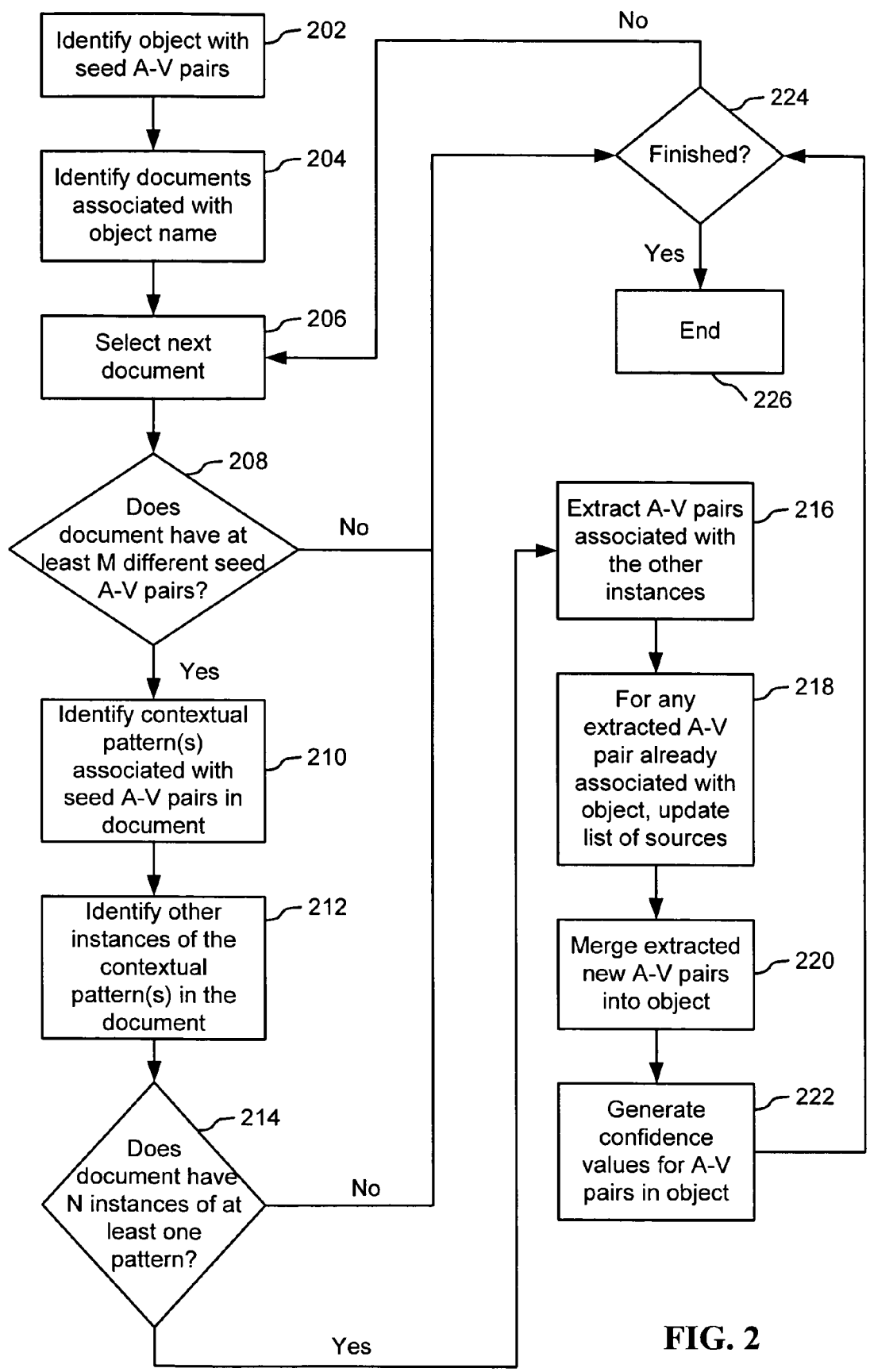
FIG. 2 is a flowchart illustrating a process for learning facts, according to some embodiments of the invention.

FIG. 2 is a flowchart illustrating a process for learning facts, according to some embodiments of the invention. An object having one or more facts identifiable as attribute-value pairs (hereinafter "A-V pairs") is identified (202). Objects and A-V pairs are described in further detail below, in relation to FIG. 3. The identified object may be an object in a facts repository. Amongst the A-V pairs associated with the object are one or more seed A-V pairs (seed facts).

Documents associated with the object are identified (204). The document identification may be done by performing a search using a name of the object as the search term. In some embodiments, the search may be a search for documents accessible via the Web that include the object name. In other words, a Web search for documents matching the object name is performed. The search may be performed using a search engine, such as a Web search engine. If an object has more than one name (as described below in relation to FIG. 3), in some embodiments one of the names (e.g., a primary name) may be used as the search term.

The seed A-V pairs may be all of the A-V pairs associated with the identified object, or the seed A-V pairs may be a subset of the A-V pairs identified with the object. In other words, the identified object has a set of one or more A-V pairs and the seed A-V pairs for the object are at least a subset of that set of one or more A-V pairs. Which A-V pairs associated with the object are seed A-V pairs may be based on predefined criteria. For example, the seed A-V pairs may be the A-V pairs that have more than one listed source in its list of sources. As another example, the seed A-V pairs may be the A-V pairs whose confidence value exceeds a predefined confidence threshold. More generally, the seed A-V pairs may be the A-V pairs that are considered to be reliable.

One of the identified documents is selected (206), and the document is checked for whether it has at least a first predefined number ("M" in FIG. 2) of different values of the seed A-V pairs within its contents. In other words, a validation check is performed on the selected document. A validation requirement is that the document must have at least M different values of the seed A-V pairs in the document. For sake of convenience, values of the seed A-V pairs are hereinafter referred to as "seed values." In some embodiments, M is 2, while in other embodiments M is an integer greater than 2. In some embodiments, the validation requirement may a requirement that the document have M different facts corresponding to M different seed A-V pairs.

In some embodiments, additional validation requirements may further include whether the seed values included in the document are close to each other or far apart in the document, whether the seed values are located in the same area of the document (e.g., the same frame in a web page), and whether the A-V pairs in the document that have the seed values have similar HTML markup.

If the document is not validated because it does not include at least M seed values and/or because other validation requirements are not satisfied (208—no), and if there are other documents awaiting validation (224—no), another document may be selected for validation (206). If there are no more documents to validate (224—yes), the process ends (226).

If the selected document is validated (208—yes), then one or more contextual patterns surrounding the content having the seed values is identified (210). The contextual pattern is the visual structure of the content including the seed values and of the nearby content, providing context to the seed values. For example, the contextual pattern may be a table or a list. In some embodiments, the contextual pattern may be identified by identifying the HTML markup associated with the content having the seed values and with the content near the seed values. The HTML markup defines how the content is to be rendered by a client application for presentation to a user; the HTML markup defines the visual structure of the content. For example, a seed value may be presented in a list of attributes and associated values that has the HTML markup:

```
<b>Name:</b> Marilyn Monroe<br>
  <b>Born:</b> June 1, 1926<br>
  <b>Died:</b> August 5, 1962<br>,
``` where the "<b>" and "</b>" tags specify that the text between the tags is to be rendered bold and the "<br>" tags insert line breaks between consecutive entries in the list.

In some embodiments, more than one contextual pattern may be identified for the seed values included in the document. In some cases, not all of the seed values in the document will have the same contextual pattern. For example, some of the seed values may be in a list, and others may be in a table. Thus, a contextual pattern may be identified for some of the seed values in the document, and another contextual pattern may be identified for other seed values in the document. More generally, one or more contextual patterns, each of them surrounding at least one of the seed values, may be identified.

In some embodiments, identification of the contextual pattern may be facilitated by generating an HTML tag tree of the document. An HTML tag tree is a tree data structure that maps the nested structure of HTML tags within the document. By generating the HTML tag tree and determining where in the tree the content with the seed values located, the HTML markup that constitutes the contextual pattern for the content may be identified.

Other instances of the identified contextual pattern (or patterns) in the document are identified (212). This includes searching the document for matches to the identified contextual pattern (or patterns). The HTML tag tree may be used to find content with matching contextual patterns. For example, if the contextual pattern is "<b>attribute:</b>value<br>", then other instances may be nearby occurrences of "<b>attribute:</b>value<br>" (e.g., other items in the same list). As another example, if the contextual pattern is a table, then the other instances may be other entries in the same table as the one that includes the seed values. In some embodiments, the identified additional instances of the identified contextual pattern are distinct instances of the contextual pattern, representing different facts from each other and from the facts represented by the seed A-V pairs.

If the number of identified other instances matching the contextual pattern is not at least a second predefined number ("N" in FIG. 2) (214—no), processing for the selected and validated document ends. In some embodiments, N is 2, while in other embodiments N is an integer greater than 2. If there are any other documents to be validated (224—no), another document may be selected for validation and processing (206). If there are no more documents to validate (224—yes), the process ends (226).

In some embodiments, the N instances matching the contextual pattern do not include the instances associated with the seed values, from which the contextual pattern was identified. In other words, the document is checked for whether it has N additional instances of content matching the contextual pattern, beyond the instances of content associated with seed values included in the document. In some other embodiments, the N instances matching the contextual pattern includes the instances associated with the seed values. That is, the one or more instances associated with the seed values, from which the contextual pattern was identified, may be included as part of the N instances. Furthermore, in some embodiments, the additional instances of content matching the contextual pattern must be close together within the document; the instances are consecutive or at most within a predefined distance in the document from each other.

In some embodiments, if more than one contextual pattern is identified at 210, the decision at 214 may be whether the document includes at least N instances of at least one of the identified contextual patterns. If none of the contextual patterns have N instances matching that contextual pattern in the document (214—no), then processing for that document ends. If there are at least N matching instances in the document for at least one of the identified contextual patterns (214—yes), then facts identifiable as A-V pairs may be extracted from each of the identified contextual patterns having at least N matching instances, as described below.

If the document does have at least N additional instances of content matching the contextual pattern (or patterns) (214—yes), facts identifiable as A-V pairs are identified and extracted from the other instances of content matching the contextual pattern (216). The extracted A-V pairs may be new A-V pairs for the object or A-V pairs already associated with the object (pre-existing A-V pairs) and stored in the fact repository 114. For pre-existing A-V pairs, the A-V pair is not stored again in the fact repository 114, but rather, the list of sources for that A-V pair in the fact repository 114 is updated (218). The list of sources, further details of which are described below, in relation to FIG. 3, lists the documents that include the fact, represented by the A-V pair, within their contents. New A-V pairs are merged into the object (220) and stored in the fact repository 114. Each new A-V pair merged into the object also includes a list of sources.

A confidence value may be determined for each A-V pair (222). In some embodiments, the confidence value is simply a count of documents that include the A-V pair within their contents. In other words, it is the number of sources listed in the list of sources of the A-V pair. In some other embodiments, the confidence value may be the count of sources that include the A-V pair, weighted by the page importance metric of each source document. In other words, the confidence value is:

$$\text{Confidence}(A\text{-}V) = \sum_{\text{sources of } A\text{-}V} \text{page–importance}(\text{source}).$$

More generally, the confidence value may be based on the number of sources in the list of sources and other factors.

After A-V pairs have been extracted from the additional instances of content and processed, if there are other documents associated with the object to be validated (224—no), another document is selected (206). Otherwise (224—yes), the process ends (226). However, it should be appreciated that the process may be performed at another time to learn additional facts or verify facts associated with the object. Seed facts for later performance of the process may be drawn from the A-V pairs that were merged into the object (as described above) and the facts that were already associated with the object at the beginning of the process described above. That is, the new A-V pairs, as well as the pre-existing A-V pairs, may be used as seed A-V pairs for later performance of the process. The process may be performed as needed or at scheduled intervals. Furthermore, the process may be performed for other objects in the fact repository.

Figure 3:
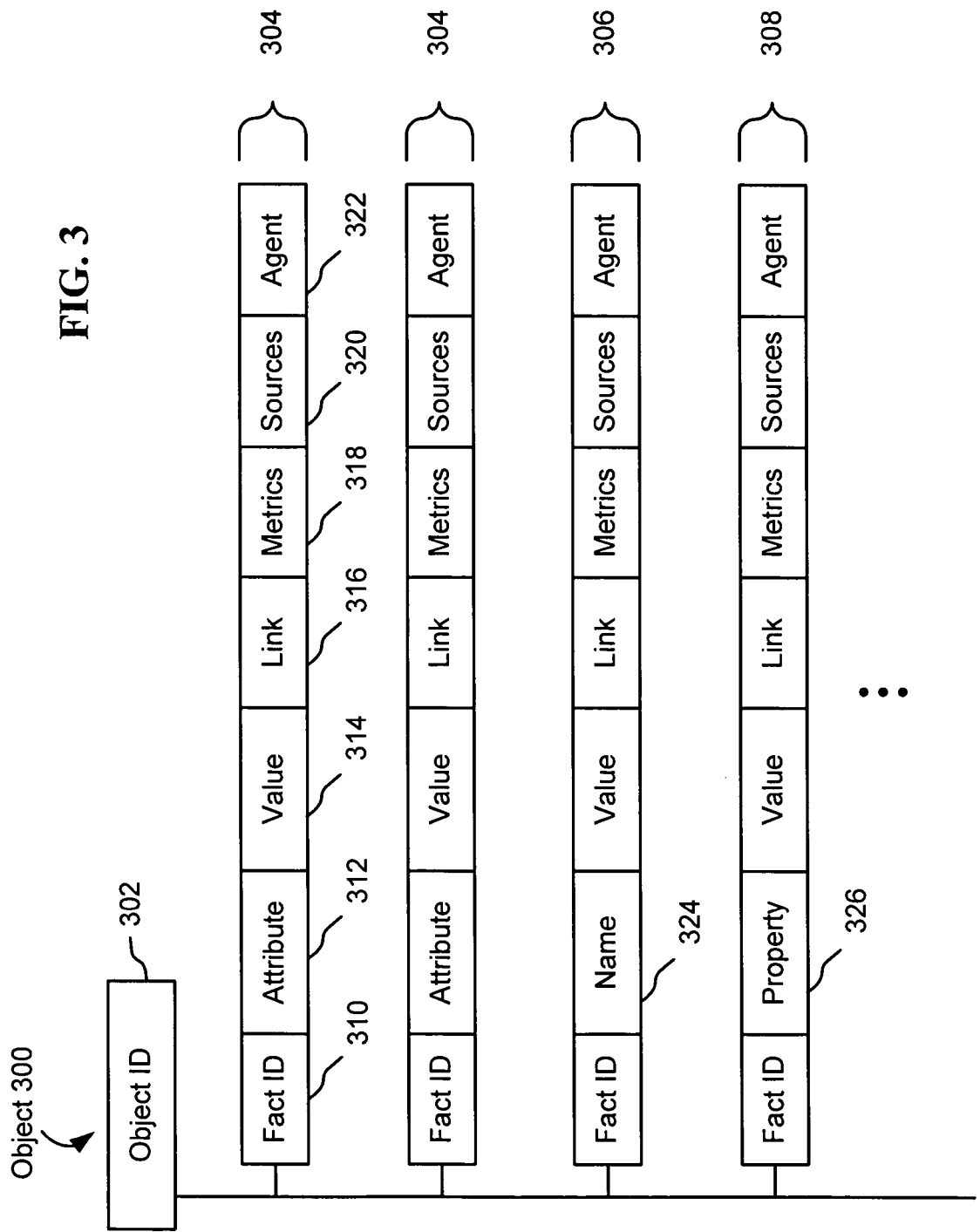
FIG. 3 illustrates a data structure for an object and associated facts in a fact repository, according to some embodiments of the invention.

FIG. 3 illustrates an exemplary data structure for an object within the fact repository 114, according to some embodiments of the invention. As described above, the fact repository 114 includes objects, each of which may include one or more facts. Each object 300 includes a unique identifier, such as the object ID 302. The object 300 includes one or more facts 304. Each fact 304 includes a unique identifier for that fact, such as a fact ID 310. Each fact 304 includes an attribute 312 and a value 314. For example, facts included in an object representing George Washington may include facts having attributes of "date of birth" and "date of death," and the values of these facts would be the actual date of birth and date of death, respectively. A fact 304 may include a link 316 to another object, which is the object identifier, such as the object ID 302 of another object within the fact repository 114. The link 316 allows objects to have facts whose values are other objects. For example, for an object "United States," there may be a fact with the attribute "president" whose value is "George W. Bush,", with "George W. Bush" being another object in the fact repository 114. In some embodiments, the value field 314 stores the name of the linked object and the link 316 stores the object identifier of the linked object. In some other embodiments, facts 304 do not include a link field 316 because the value 314 of a fact 304 may store a link to another object.

Each fact 304 also may include one or more metrics 318. The metrics may provide indications of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 304 includes a list of sources 320 that include the fact and from which the fact was extracted. Each source may be identified by a Uniform Resource Locator (URL), or Web address, or any other appropriate form of identification and/or location, such as a unique document identifier.

In some embodiments, some facts may include an agent field 322 that identifies the module that extracted the fact. For example, the agent may be a specialized module that extracts facts from a specific source (e.g., the pages of a particular web site, or family of web sites) or type of source (e.g., web pages that present factual information in tabular form), or a module that extracts facts from free text in documents throughout the Web, and so forth.

In some embodiments, an object 300 may have one or more specialized facts, such as a name fact 306 and a property fact 308. A name fact 306 is a fact that conveys a name for the entity or concept represented by the object 300. For example, for an object representing the country Spain, there may be a fact conveying the name of the object as "Spain." A name fact 306, being a special instance of a general fact 304, includes the same parameters as any other fact 304; it has an attribute, a value, a fact ID, metrics, sources, etc. The attribute 324 of a name fact 306 indicates that the fact is a name fact, and the value is the actual name. The name may be a string of characters. An object 300 may have one or more name facts, as many entities or concepts can have more than one name. For example, an object representing Spain may have name facts conveying the country's common name "Spain" and the official name "Kingdom of Spain." As another example, an object representing the U.S. Patent and Trademark Office may have name facts conveying the agency's acronyms "PTO" and "USPTO" and the official name "United States Patent and Trademark Office." If an object does have more than one name fact, one of the name facts may be designated as a primary name and other name facts may be designated as secondary names.

A property fact 308 is a fact that conveys a statement about the entity or concept represented by the object 300 that may be of interest. For example, for the object representing Spain, a property fact may convey that Spain is a country in Europe. A property fact 308, being a special instance of a general fact 304, also includes the same parameters (such as attribute, value, fact ID, etc.) as other facts 304. The attribute field 326 of a property fact 308 indicates that the fact is a property fact, and the value field is a string of text that conveys the statement of interest. For example, for the object representing Spain, the value of a property fact may be the text string "is a country in Europe." Some objects 300 may have one or more property facts while other objects may have no property facts.

It should be appreciated that the data structure illustrated in FIG. 3 and described above is merely exemplary. The data structure of the fact repository 114 may take on other forms. Other fields may be included in facts and some of the fields described above may be omitted. Additionally, each object may have additional special facts aside from name facts and property facts, such as facts conveying a type or category (for example, person, place, movie, actor, organization, etc.) for categorizing the entity or concept represented by the object. In some embodiments, an object's name(s) and/or properties may be represented by special records that have a different format than the general facts records 304 associated with the attribute-value pairs of an object.

Figure 4:
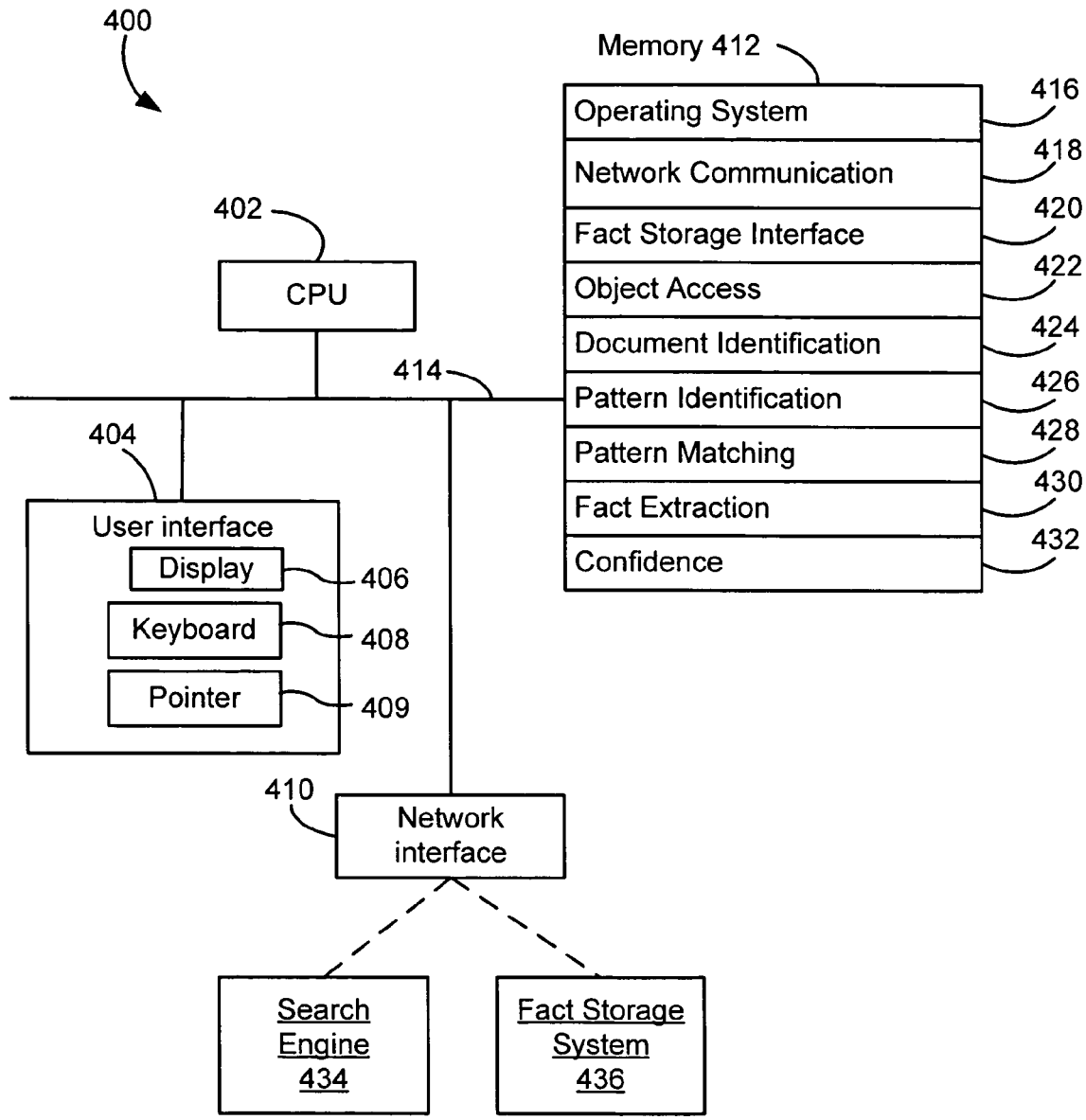
FIG. 4 illustrates a document processing system, according to some embodiments of the invention.

FIG. 4 is a block diagram illustrating a fact learning system 400, according to some embodiments of the invention. The system 400 typically includes one or more processing units (CPU's) 402, one or more network or other communications interfaces 410, memory 412, and one or more communication buses 414 for interconnecting these components. The system 400 optionally may include a user interface 404 comprising a display device 406, keyboard 408 and pointer device 409, such as a mouse, track ball or touch sensitive pad. Memory 412 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 412 may optionally include one or more storage devices remotely located from the CPU(s) 402. In some embodiments, the memory 412 stores the following programs, modules and data structures, or a subset thereof:

- an operating system 416 that includes procedures for handling various basic system services and for performing hardware dependent tasks;
- a network communication module (or instructions) 418 that is used for connecting the fact learning system 400 to other computers via the one or more communication network interfaces 410 (wired or wireless), such as the Internet, other wide area networks, local area networks, metropolitan area networks, and so on;
- a fact storage interface (or instructions) 420 that is used for connecting the fact learning system 400 to the fact storage system 436 (which may include a fact index and fact repository, and/or other appropriate data structures);

an object access module (or instructions) 422 for accessing objects and associated facts stored in the fact storage system 436, a document identification module (or instructions) 424 for identifying documents associated with an object and identifying seed facts within the documents;

a pattern identification module (or instructions) 426 for identifying the contextual pattern associated with facts in documents;

a pattern matching module (or instructions) 428 for finding instances of content in documents matching contextual patterns;

a fact extraction module (or instructions) 430 for extracting facts from documents, merging new facts into objects, and updating lists of documents; and a confidence module 432 for determining confidence values of facts.

In some embodiments, memory 412 of system 400 includes the fact index instead of an interface 420 to the fact index. The system 400 also includes a fact storage system 436 for storing facts. As described above, in some embodiments each fact stored in the fact storage system 436 includes a corresponding list of sources from which the respective fact was extracted. The system 400 may also include a search engine 434 for searching for documents and/or for searching for facts in the fact storage system. However, in other embodiments, the "back end system," which extracts facts from source documents and adds them to the fact storage system 436, may be a totally different system from a "front end" that includes a search engine for searching the facts storage system. The front end system, which is not the subject of the present document, may receive a copy of the fact repository and fact index built by the back end system.

It should be appreciated that at least some of the modules described above may be grouped together as one module. For example, the modules 426 and 428 may be grouped into a pattern module.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 412 may store a subset of the modules and data structures identified above. Furthermore, memory 412 may store additional modules and data structures not described above.

Although FIG. 4 shows a "fact learning system," FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a fact learning system and how features are allocated among them will vary from one implementation to another, and may depend in part on the amount of data traffic that the system must handle during peak usage periods as well as during average usage periods, and may further depend on the size of the fact repository and the amount of fact information each server can efficiently handle.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of learning facts, comprising:
at a computer system including one or more processors and memory storing one or more programs, the one or more processors executing the one or more programs to perform the operations of:
accessing an object within a fact repository, wherein the object includes a name and one or more seed facts;
identifying a set of documents having content and associated with the object name, each document in the set having at least a first predefined number of distinct seed facts in common with the seed facts of the object;
for each of the documents in the identified set:
identifying in the document a contextual pattern associated with the respective seed facts in the document;
confirming that the document includes at least a second predefined number of instances of content matching the contextual pattern in addition to the respective seed facts; and
only when the confirming is successful, extracting an extracted fact from a respective instance of content matching the contextual pattern and merging the extracted fact into the object;
wherein the first predefined number is greater than one and the second predefined number is greater than one.

2. The method of claim 1, further comprising repeating the extracting and merging operations for one or more instances of content matching the contextual pattern in the document.

3. The method of claim 1, wherein the extracted and merged fact comprises an attribute-value pair that is distinct from all other attribute-value pairs of the object.

4. The method of claim 1, further comprising:
identifying an attribute-value pair in the document that matches a respective attribute-value pair of the object; and
adding an identifier of the document to a list of documents associated with the respective attribute-value pair of the object.

5. The method of claim 4, further comprising generating a confidence value for each attribute-value pair of the object that is based on the documents in the list of documents associated with the attribute-value pair.

6. The method of claim 4, further comprising generating a confidence value for each attribute-value pair of the object that corresponds to a number of documents in the list of documents associated with the attribute-value pair.

7. A system for learning facts, comprising:
one or more processors; and
memory storing one or more modules having instructions for execution by the one or more processors, including instructions:

to access an object within a fact repository, wherein the object includes a name and one or more seed facts;

to identify a set of documents having content and associated with the object name, each document in the set having at least a first predefined number of distinct seed facts in common with the seed facts of the object;

for each of the documents in the identified set:
to identify in the document a contextual pattern associated with the respective seed facts in the document; and to confirm that the document includes at least a second predefined number of instances of content matching the contextual pattern in addition to the respective seed facts; and to extract an extracted fact only from a respective instance of content matching the contextual pattern and merge the extracted fact into the object;

wherein the first predefined number is greater than one and the second predefined number is greater than one.

8. The system of claim 7, wherein the one or more modules include instructions to repeatedly extract and merge attribute-value pairs from instances of content matching the contextual pattern in the document.

9. The system of claim 7, wherein the extracted and merged fact comprises an attribute-value pair that is distinct from all other attribute-value pairs of the object.

10. The system of claim 7, wherein the one or more modules include instructions to:
identify an attribute-value pair in the document that matches a respective attribute-value pair of the object; and add an identifier of the document to a list of documents associated with the respective attribute-value pair of the object.

11. The system of claim 10, further comprising instructions to generate a confidence value for each attribute-value pair of the object that is based on the documents in the list of documents associated with the attribute-value pair.

12. The system of claim 10, further comprising instructions to generate a confidence value for each attribute-value pair of the object that corresponds to a number of documents in the list of documents associated with the attribute-value pair.

13. A computer readable storage medium storing one or more programs for execution by a computer system, the one or more programs comprising instructions for:
accessing an object within a fact repository, wherein the object includes a name and one or more seed facts;

identifying a set of documents having content and associated with the object name, each document in the set having at least a first predefined number of distinct seed facts in common with the seed facts of the object;

for each of the documents in the identified set:
identifying in the document a contextual pattern associated with the respective seed facts in the document;

confirming that the document includes at least a second predefined number of instances of content matching the contextual pattern in addition to the respective seed facts; and only when the confirming is successful, extracting an extracted fact from a respective instance of content matching the contextual pattern and merging the extracted fact into the object;

wherein the first predefined number is greater than one and the second predefined number is greater than one.

14. The computer readable storage medium of claim 13, further comprising repeating the extracting and merging operations for one or more instances of content matching the contextual pattern in the document.

15. The computer readable storage medium of claim 13, wherein the extracted and merged fact comprises an attribute-value pair that is distinct from all other attribute-value pairs of the object.

16. The computer readable storage medium of claim 13, further comprising instructions for:
identifying an attribute-value pair in the document that matches a respective attribute-value pair of the object; and adding an identifier of the document to a list of documents associated with the respective attribute-value pair of the object.

17. The computer readable storage medium of claim 16, further comprising instructions for generating a confidence value for each attribute-value pair of the object that is based on the documents in the list of documents associated with the attribute-value pair.

18. The computer readable storage medium of claim 16, further comprising instructions for generating a confidence value for each attribute-value pair of the object that corresponds to a number of documents in the list of documents associated with the attribute-value pair.

19. A system for learning facts, comprising:
one or more processors; and memory storing one or more modules having instructions for execution by the one or more processors;

means for accessing an object within a fact repository, wherein the object includes a name and one or more seed facts;

means for identifying a set of documents having content and associated with the object name, each document in the set having at least a first predefined number of distinct seed facts in common with the seed facts of the object;

means, for each of the documents in the identified set:
for identifying in the document a contextual pattern associated with the respective seed fact in the document;

for confirming that the document includes at least a second predefined number of instances of content matching the contextual pattern in addition to the respective seed facts; and only when the confirming is successful, for extracting an extracted fact from a respective instance of content matching the contextual pattern and merging the extracted fact into the object;

wherein the first predefined number is greater than one and the second predefined number is greater than one.

* * * * *